United States Patent [19]
Vauchel

[11] Patent Number: 6,000,216
[45] Date of Patent: Dec. 14, 1999

[54] ACTUATING SYSTEM FOR A CASCADE TYPE THRUST REVERSER

[75] Inventor: Guy Bernard Vauchel, Le Havre, France

[73] Assignee: Societe Hispano Suiza, Paris, France

[21] Appl. No.: 09/003,788

[22] Filed: Jan. 7, 1998

[51] Int. Cl.[6] .................................................. F02K 3/02
[52] U.S. Cl. ................... 60/226.2; 239/265.33; 239/265.37; 244/110 B
[58] Field of Search ...................... 60/226.2; 239/265.33, 239/265.37; 244/110 B

[56] References Cited

U.S. PATENT DOCUMENTS

| | | |
|---|---|---|
| 3,500,645 | 3/1970 | Hom . |
| 4,232,516 | 11/1980 | Lewis et al. ........................... 60/226 A |
| 4,407,120 | 10/1983 | Timms . |
| 5,039,171 | 8/1991 | Lore . |
| 5,806,302 | 9/1998 | Cariola et al. ............................ 60/204 |
| 5,813,609 | 9/1998 | Ellerhost ............................ 239/127.3 |

FOREIGN PATENT DOCUMENTS

| | | |
|---|---|---|
| 0 109 219 | 5/1984 | European Pat. Off. . |
| 0 321 993 | 6/1989 | European Pat. Off. . |
| 0 413 635 | 2/1991 | European Pat. Off. . |
| WO 96/34193 | 10/1996 | WIPO . |

Primary Examiner—Timothy S. Thorpe
Assistant Examiner—Ehud Gartenberg
Attorney, Agent, or Firm—Bacon & Thomas PLLC

[57] ABSTRACT

A thrust reverser is disclosed for a turbojet engine having a cowling with a longitudinal axis, the cowling having an inner surface forming an outer boundary of a gas flow duct and a reverse thrust opening. The thrust reverser has a panel movable with respect to the cowling, the panel being movable between a forward thrust position in which it covers the reverse thrust opening in the cowling and reverse thrust position wherein the opening is uncovered. Thrust reversing cascades are located in the reverse thrust opening of the cowling to direct gases passing through the opening in a reverse thrust direction. A cowling frame is connected through the cowling by a flange engaging a groove on the cowling structure, the flange and the groove having mutually engaging surfaces. A linear actuator is connected to the thrust reverser panel at a first connection and to the cowling frame at a second connection such that the linear force axis when the actuator moves the thrust reverser panel between the forward and reverse thrust positions passes through the first and second connections, as well as the engagement surfaces between the flange and the groove.

7 Claims, 2 Drawing Sheets

ACTUATING SYSTEM FOR A CASCADE TYPE THRUST REVERSER

BACKGROUND OF THE INVENTION

The present invention relates to an actuating system for a cascade-type thrust reverser in which the torque or moment forces exerted on the cowling by the linear actuator are minimized, or eliminated altogether.

Turbofan-type turbojet engines are well known in the art and typically comprise a fan located at the front of the turbojet engine, which fan directs a flow of bypass air through a duct bounded by an engine cowling on the inside and a fan cowling on the outside. The generally annular duct bounded by the engine cowling and the fan cowling may channel both the bypass flow and the primary exhaust flow at a downstream portion of the turbojet engine, or the duct may channel only the bypass flow. In aircraft in which the engine is mounted outside of the airframe structure, the fan cowling is configured to provide an aerodynamic outer surface to reduce drag.

Various types of thrust reversers may be utilized with the fan cowling to provide the necessary thrust reversing forces. A cascade thrust reverser is among the known types and is illustrated in FIG. 1. A thrust reverser panel 7 is affixed to the engine structure so as to be movable with respect to the fan cowling 5. In a forward thrust position, illustrated in FIG. 1, the thrust reverser panel 7 covers a reverse thrust opening formed in the cowling such that the gases are directed in a forward thrust position through the annular duct 17 bounded on the outside by the fan cowling and thrust reverser panel 7, and on the inside by the jet engine cowling 16. Thrust reverser flap 12 is pivotally attached to the thrust reverser panel 7 and is also pivotally attached to the engine cowling 16 by linkrod 14 and pivot 15. In known fashion, as the thrust reverser panel 7 moves rearwardly (towards the right as viewed in FIG. 1), the flap 12 pivots inwardly so as to substantially block the annular flow duct 17 and to force the gases outwardly through the cowling across the thrust reversing cascades 13.

Displacement of the thrust reverser panel 7 between the forward and reverse thrust positions is achieved by linear actuator 4. Linear actuator 4 typically comprises a cylinder having an extendable and retractable rod with the cylinder being fixedly attached to and extending through the cowling frame 6, while the distal end of the rod is connected to the thrust reverser panel 7 at pivot 9. Typical, known thrust reversers of this type are illustrated in European Patent 0 109 219 and U.S. Pat. No. 3,500,645.

While generally successful, these known thrust reversers have created some problems. Specifically, the rigid attachment of the linear actuator 4 to the cowling frame 6 is radially displaced from the engagement of flange 3, formed on the cowling frame 6, with a groove formed in the cowling structure 5 by a distance L1. During actuation of the thrust reverser, forces F1 exerted on the cowling frame 6 by the linear actuator 4 generate a torque or moment M1 about the engagement of the flange 3 with the groove formed in the cowling structure 5. Since the thrust reverser panel 7 moves axially relative to the cowling, the linear actuators 4 are also oriented substantially parallel to the longitudinal axis of the cowling necessitating their attachment to the cowling frame 6 at a location displaced radially outwardly from the engagement of the flange 3 with the groove formed in the cowling structure 5. This positioning is also required since the linear actuator is attached to the thrust reverser panel 7 in a portion where the overall radially oriented thickness of the panel 7 is reduced. The connection 9 is located at a radial location of the convex streamlines of the gas flow.

The flaps 12 are covered by an inner portion of the thrust reverser panel 7 and a lower portion of the cowling frame 6. The cowling frame 6 is shaped to absorb the aerodynamic stresses acting on the thrust reverser structure during thrust reverser actuation. The structural requirements of the cowling frame 6 generally preclude mounting the linear actuator 4 in a more radially inward position.

This location of the linear actuator 4 also places part of the actuator, along with the associated hydraulic plumbing connected to the actuator, forwardly of the cowling frame 6. Usually this forward area is a designated fire zone and extra precautions must be taken to insure that no leakage of hydraulic fluid, which is flammable, can take place.

Another problem is caused by the location of the cascades 13 radially outwardly of the flange 3. Such a location increases the torque or moment acting on the cowling frame 6, since the resultant of the thrust reversing forces transferred to the cowling frame 6 by the cascades 13 during thrust reversal increase the torque or moment M1, thereby requiring the cowling frame 6 to be structurally reinforced.

SUMMARY OF THE INVENTION

A thrust reverser is disclosed for a turbojet engine having a cowling with a longitudinal axis, the cowling having an inner surface forming an outer boundary of a gas flow duct and a reverse thrust opening. The thrust reverser has a panel movable with respect to the cowling, the panel being movable between a forward thrust position in which it covers the reverse thrust opening in the cowling and reverse thrust position wherein the opening is uncovered. Thrust reversing cascades are located in the reverse thrust opening of the cowling to direct gases passing through the opening in a reverse thrust direction. A cowling frame is connected through the cowling by a flange engaging a groove on the cowling structure, the flange and the groove having mutually engaging surfaces. A linear actuator is connected to the thrust reverser panel at a first connection and to the cowling frame at a second connection such that the linear force axis when the actuator moves the thrust reverser panel between the forward and reverse thrust positions passes through the first and second connections, as well as the engagement surfaces between the flange and the groove.

One of the objectives of the present invention is to provide a thrust reverser actuating system which minimizes, or eliminates altogether, any torque or moment acting on the cowling frame during thrust reverser operation. This objective enables the linear actuator, the cascades, as well as the cowling frame to be lighter in construction, thereby reducing the overall weight of the thrust reverser.

The thrust reverser according to the present invention also positions the thrust reversing cascades such that the resultant of the thrust reversing forces passes through the engagement surfaces of the flange and the groove to thereby eliminate any moment or torque exerted on the cowling frame by the gases passing through the thrust reversing cascades.

DETAILED DESCRIPTION OF THE PREFERRED EMBODIMENTS

Figure 1:
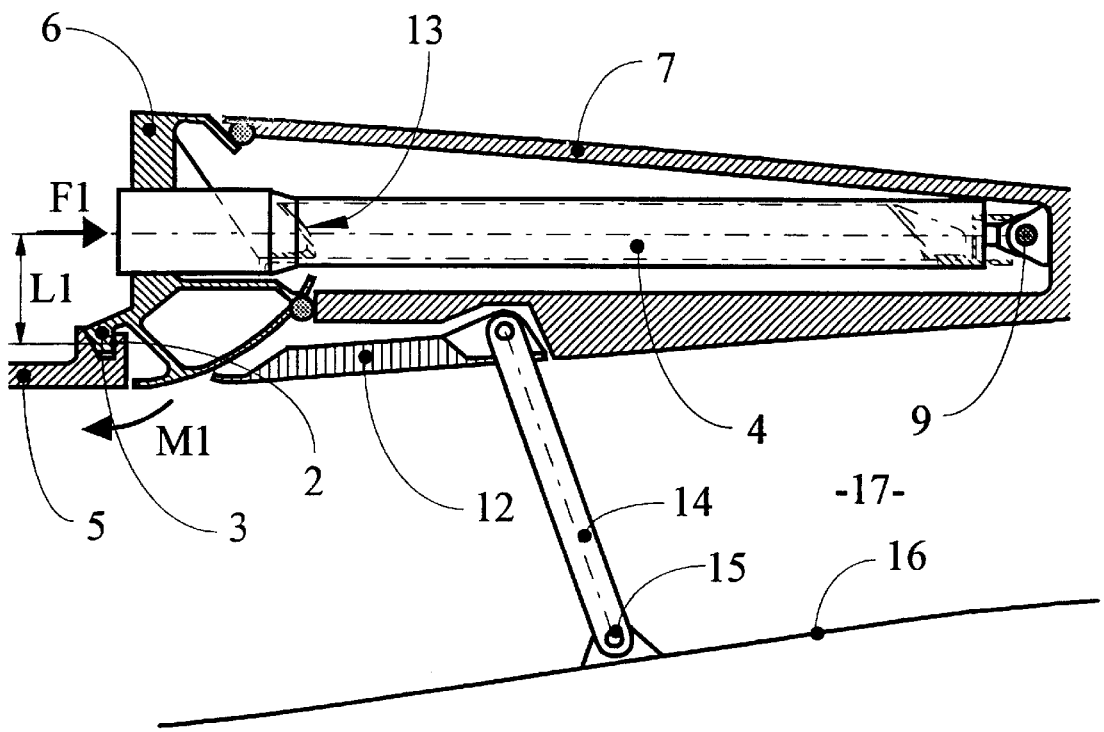
FIG. 1 is a partial, cross-sectional view of a known type of cascade thrust reverser.
Figure 2:
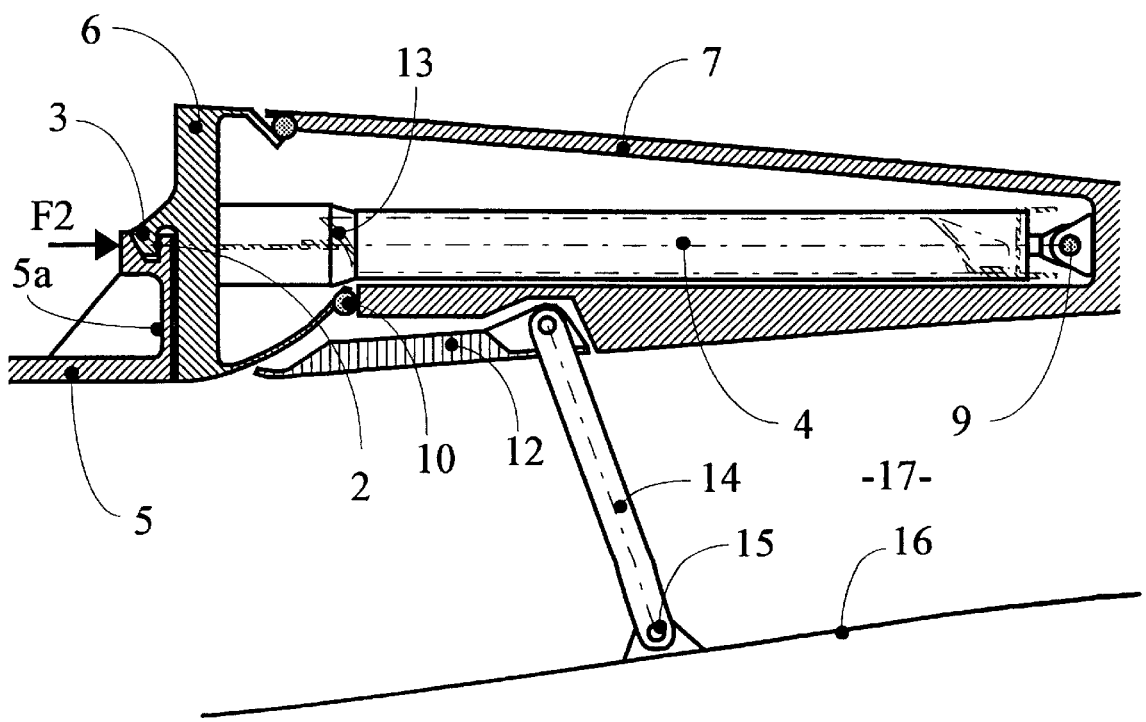
FIG. 2 is a partial, longitudinal, cross-sectional view of a first embodiment of a thrust reverser according to the present invention.

A first embodiment of the present invention is illustrated in FIG. 2. As illustrated, thrust reverser panel 7 is movable between forward and reverse thrust positions, as in the prior art device and is illustrated in the forward thrust position. A flap 12 is pivotally attached to the thrust reverser panel 7 such that, in the forward thrust position, the inner surface of the panel forms a portion of the outer boundary of the gas flow duct 17. In the reverse thrust position, the flap 12 blocks substantially all of the gas flow duct 17 forcing the gases to flow outwardly through the cascades 13 to produce a reverse thrust effect. Panel 12 is pivotally connected to the engine cowling 16 by link 14 and pivot 15.

The thrust reverser panel 7 is moved between the forward and reverse thrust positions by linear actuator 4 having an extendable and retractable rod connected to the thrust reverser panel 7 at connection 9. Seals 10 between the forward portion of the thrust reverser panel 7 and the cowling frame 6 prevent leakage of the gases passing through the flow duct 17 when the panel 7 is in the forward thrust position.

The cowling frame 6 is connected to the cowling structure 5 by engagement of a flange 3 with a correspondingly shaped groove. In this particular embodiment, the flange 3 extends from the cowling frame 6 and engages a groove formed in the cowling structure 5. The flange 3 and the sides of the groove have engaging surfaces 2. The groove is formed in a radially extending portion 5a of the cowling structure 5 such that the forces exerted on the cowling frame 6 during actuation of the linear actuator 4, indicated by arrow F2, extend in a direction passing through the connection point 9, the connection of the linear actuator 4 to the cowling frame 6, as well as the engaging surfaces 2. By passing through all of these three points, the force F2 produces no resultant torque or moment on the cowling structure 5 or the cowling frame 6. By use of the extension 5a in a radial direction, the orientation of the linear actuator 4 can be maintained substantially parallel to the longitudinal axis (not shown) of the cowling 5. A line connecting the engaging surfaces 2 and the connection point 9 will be substantially coincident with the linear force axis of the linear actuator 4.

The linear actuator 4 can be directly affixed to the cowling frame 6, or it may be combined with a structure that is independent of the cowling frame 6 and which is directly connected to the cowling structure 5.

As can be seen, the linear actuator 4 is connected to the rear surface of the cowling frame 6 and does not extend through the cowling frame as in the known prior art. By using such an attachment, the structural integrity of the cowling frame 6 may be maintained at a lighter weight of the cowling frame 6, and the hydraulic lines associated with the linear actuator are located to the rear of cowling frame 6, thereby removing them from the fire zone.

Figure 3:
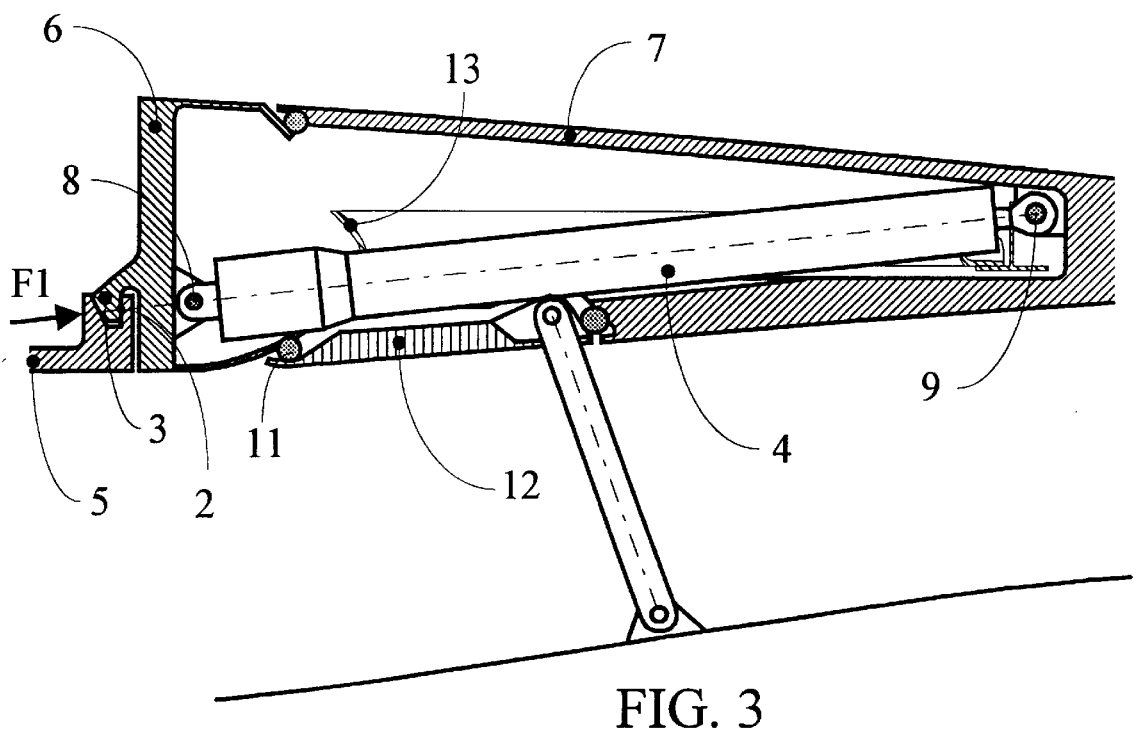
FIG. 3 is a view similar to FIG. 2, illustrating a second embodiment of the thrust reverser according to the present invention.

An alternative embodiment of the invention is illustrated in FIG. 3. In this embodiment, the linear actuator 4 is again mounted to the rear of the cowling frame 6 and is pivotally attached to the cowling frame 6 by connection 8. As in the previous embodiment, the rod of the linear actuator 4 is attached ot the thrust reverser panel 7 at connection 9. In this embodiment, the forward portion of the linear actuator 4 is moved radially inwardly as opposed to the known prior art thereby causing the linear force axis of the linear actuator to be non-parallel to the longitudinal axis of the cowling. It also enables the flange 3 to be located in a more radially inward position and eliminates the necessity of providing a radial extension 5a to the cowling structure 5 as in the previous embodiment. As can be seen, the linear force axis of the linear actuator 4 passes through the connection points 8 and 9, as well as the engaging surfaces 2 between the flange 3 and the groove formed in the cowling structure 5, thereby eliminating any torque or moment applied to the cowling. In this embodiment, seals 11 are provided between the flap 12 and the cowling structure 5 and the adjacent portion of the thrust reverser panel 7 to prevent leakage of the gases flowing through the gas flow duct when the elements are in their forward thrust positions.

Figure 4:
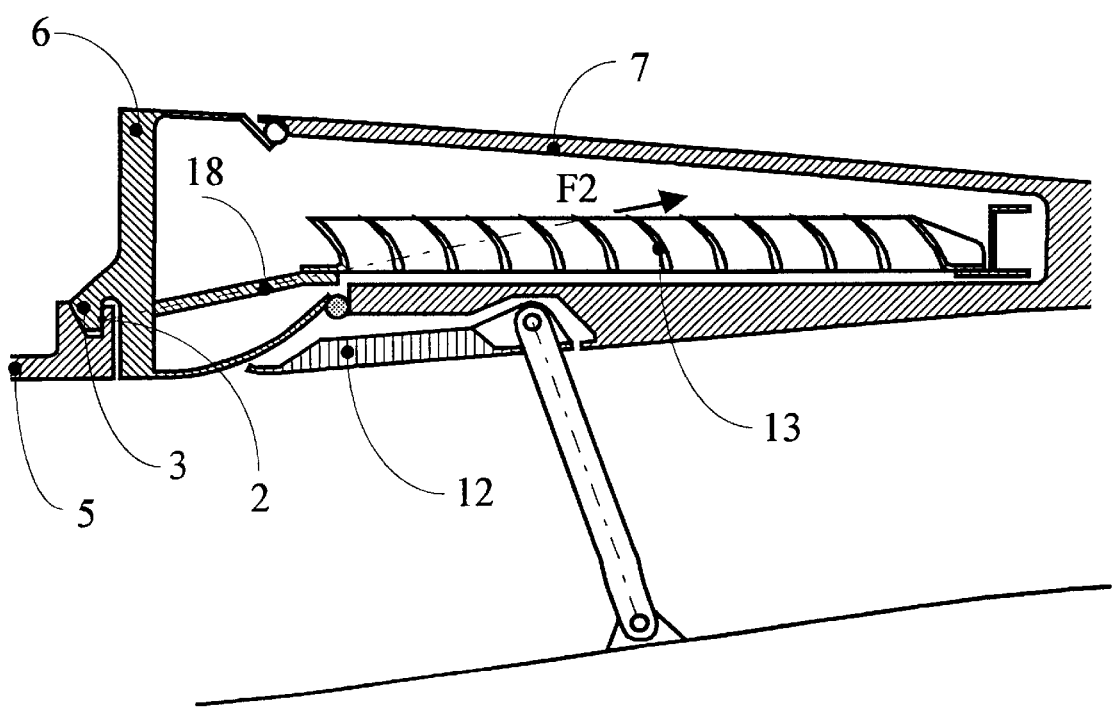
FIG. 4 is a partial, longitudinal, cross-sectional view of a thrust reverser according to the present invention illustrating the location of the thrust reversing cascades.

FIG. 4 illustrates the position of the thrust reversing cascades which may be utilized with either of the previously described embodiments. The gas flowing outwardly through the cascades 13 produces a thrust reversing force having a resultant force F2 illustrated in FIG. 4. The cascades 13 are attached to the rear of the cowling frame 6 by frame 18. The location of cascades 13 and the frame 18 are such that the resultant thrust reversing force F2 passes through the engaging surfaces 2 between the flange 3 and the groove formed in the cowling structure 5. Again, this eliminates any torque or moment applied to the structure by the thrust reversing forces.

Frequently the vanes of a particular thrust reversing cascade vary in configuration. Thus, the support frame 18 and the attachment point of the frame 18 to the cascades 13 may take into account these variations in orientation of the force component F2 and may vary peripherally to meet the criteria noted above. In such variations, the support frame 18 is aligned as closely as possible with the resultant force F2 generated by all of the various cascades.

The foregoing description is provided for illustrative purposes only and should note be construed as in any way limiting this invention, the scope of which is defined solely by the appended claims.

I claim:

1. A thrust reverser for a turbofan-type turbojet engine having a cowling with a longitudinal axis, the cowling having an inner surface forming an outer boundary of a gas flow duct and a reverse thrust opening, the thrust reverser comprising:

a) a thrust reverser panel movable with respect to the cowling between a forward thrust position wherein the thrust reverser panel covers the reverse thrust opening in the cowling and a reverse thrust position wherein the reverse thrust opening is uncovered;

b) thrust reversing cascades located in the reverse thrust opening of the cowling to direct gases passing through the reverse thrust opening in a reverse thrust direction;

c) a cowling frame connected to the cowling by a flange on one of the cowling frame and cowling engaging a groove on the other of the cowling frame and cowling; and, d) an actuator moving the thrust reverser panel between the forward and reverse thrust positions, the actuator comprising a linear actuator having first and second elements movable with respect to each other along a linear force axis, the first element connected to the thrust reverser panel at a first connection and the second element connected to a rear of the cowling frame at a second connection such that the linear force axis passes through the first and second connections, and through engaging surfaces between the flange and the groove.

2. The thrust reverser of claim 1 wherein the second actuator element is fixedly connected to a rear of the cowling frame.

3. The thrust reverser of claim 1 wherein the second actuator element is pivotally connected to the cowling frame.

4. The thrust reverser of claim 1 wherein the linear force axis extends substantially parallel to the longitudinal axis of the cowling.

5. The thrust reverser of claim 1 further comprising:
a) a flap attached to the thrust reverser panel so as to substantially block the gas flow duct when the thrust reverser panel is in the reverse thrust position, the panel having a forward edge; and,
b) a seal located between the forward edge of the panel and the cowling to seal therebetween when the thrust reverser panel is in the forward thrust position.

6. The thrust reverser of claim 1 wherein the thrust reversing cascades are attached to the cowling frame such that a resultant thrust reversing force passes through the engaging surfaces between the flange and the groove.

7. The thrust reverser of claim 1 wherein the flange is formed on the cowling frame and the groove is formed in the cowling.

* * * * *

UNITED STATES PATENT AND TRADEMARK OFFICE
CERTIFICATE OF CORRECTION

PATENT NO. : 6,000,216
DATED : December 14, 1999
INVENTOR(S) : VAUCHEL, Guy Bernard It is certified that error appears in the above-indentified patent and that said Letters Patent is hereby corrected as shown below:

Title page, after line [22], insert --[30] Foreign Application Priority Data

January 9, 1997 [FR] France 97.00135 --

Signed and Sealed this

Twenty-sixth Day of December, 2000

*Attest:*

Q. TODD DICKINSON

*Attesting Officer*  *Director of Patents and Trademarks*